Sept. 25, 1962 P. K. BALTZER 3,055,833

MIXED FERROSPINELS

Filed Oct. 31, 1957

INVENTOR
PHILIP K. BALTZER
BY J. L. Whittaker
ATTORNEY

United States Patent Office 3,055,833
Patented Sept. 25, 1962

3,055,833

MIXED FERROSPINELS

Philip K. Baltzer, Princeton, N.J., assignor to Radio Corporation of America, a corporation of Delaware Filed Oct. 31, 1957, Ser. No. 693,707
18 Claims. (Cl. 252—62.5)

This invention relates to improved mixed ferrospinels and particularly, but not necessarily exclusively, to polycrystalline bodies of sintered metallic oxides having unexpected and useful magnetic properties and to methods of manufacture thereof.

The term "spinels" generally refers to a class of materials having the molar formula $M^{2+}(M^{3+})_2O_4$ and having a spinel crystal structure. $M^{2+}$ may be one or more divalent cations. $M^{3+}$ may be one or more trivalent cations.

A "single spinel" is a spinel in which $M^{2+}$ is a single divalent cation and $M^{3+}$ is a single trivalent cation. A "mixed spinel" is a spinel in which either or both $M^{2+}$ comprises more than one divalent cation or $M^{3+}$ comprises more than one trivalent cation. A mixed spinel may also be defined as a single homogeneous material comprising two or more single spinels in a solid solution. The ferromagnetic spinels are referred to as "ferrospinels." The term "ferrites" is generally used to refer to sintered polycrystalline bodies or cores consisting essentially of ferrospinel crystallites. The term "ferrites," however, includes also bodies of crystallites other than spinels.

Magnetic cores are useful in many electronic applications. For devices using saturable reactors, it is desirable to provide magnetic cores having a substantially rectangular magnetic hysteresis loop and a low coercive force. For example, in the particular case of magnetic memory devices, it is desirable to provide cores that are magnetically saturated by a magnetizing pulse of unit magnitude but are unaffected by a series of magnetizing pulses of one half unit magnitude. This requirement and the reasons therefor are explained in The Proceedings of the IRE, vol. 44, No. 10, October 1956, pages 1243–1246.

An object of this invention is to provide improved mixed ferrospinels.

Another object is to provide improved methods for preparing mixed ferrospinels and bodies thereof.

A further object is to provide improved magnetic cores including the mixed ferrospinels of the invention.

The improved mixed ferrospinels herein may be represented by the molar formula:

$$Ni_{1-x}Zn_x(Fe_{1-y}Mn_y)_2O_4$$

where:

$$x=0.00\text{–}0.95$$
$$y=0.01\text{–}0.80$$

many of which exhibit a substantially rectangular magnetic hysteresis loop at the operating temperature. The ferrospinels which are most useful for operation near room temperature (20° C.) are in the range where $x=0.00$ to 0.90, and $y=0.01$ to 0.40. The ferrospinels which are most useful for operation near liquid nitrogen temperatures (−196° C.) are in the range where $x=0.30$ to 0.95, and $y=0.01$ to 0.80.

The invention herein may also be described as nickel zinc ferrites wherein up to 80 mol percent of the trivalent iron ($Fe^{3+}$) is replaced with trivalent manganese ($Mn^{3+}$). The substitution of trivalent manganese for trivalent iron has the effect of causing the domain magnetic anisotropy at the operating temperature to pass from a negative value through zero to a positive value. A substantially rectangular hysteresis loop for the ferrospinels herein is produced when the domain magnetic anisotropy is at or near zero.

The invention includes also improved magnetic cores, preferably sintered polycrystalline bodies, consisting essentially of crystallites of the mixed ferrospinels of the invention. The invention includes also improved methods for manufacturing mixed ferrospinels and particularly the magnetic cores herein. The methods herein preferably comprise sintering in an oxidizing atmosphere a shaped body of a calcined mixture including oxides of nickel, manganese, iron, and optionally zinc in the desired molar proportions and then annealing the sintered body in oxygen at an elevated temperature.

The invention is described in greater detail by reference to the accompanying drawing in which.

Figure 1:
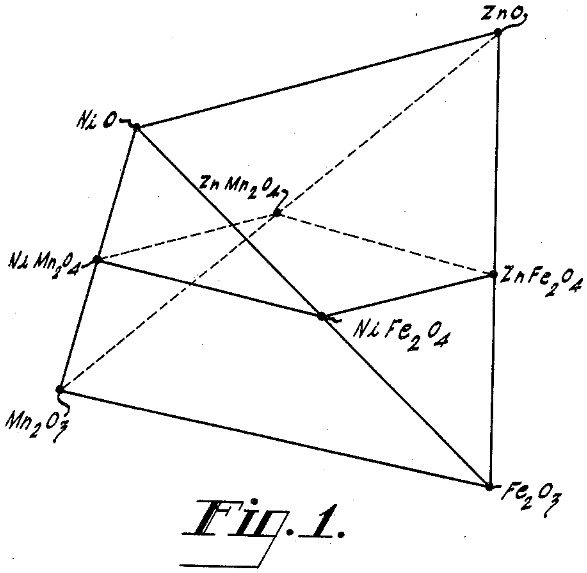
FIGURE 1 is a graphical representation of the system $NiO—ZnO—Fe_2O_3—Mn_2O_3$.
Figure 3A:
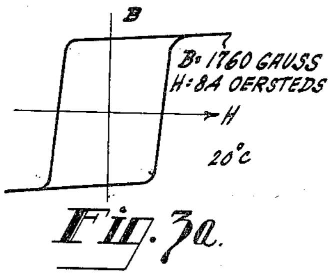
Figure 3B:
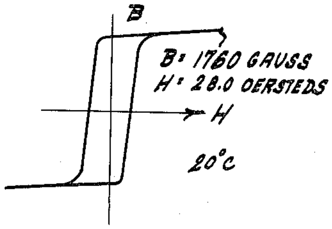
Figure 4A:
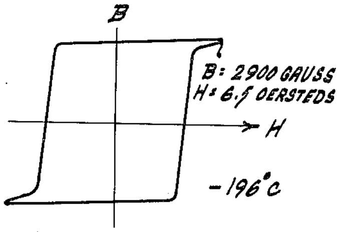
Figure 4B:
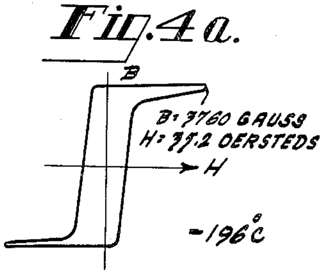

of the graphical representation of FIGURE 1 identifying the ferrospinel compositions of the invention herein, FIGURES 3*a* and 3*b* are magnetic hysteresis loops of the composition $Ni(Fe_{0.92}Mn_{0.08})_2O_4$ at room temperature, and FIGURES 4*a* and 4*b* are magnetic hysteresis loops of the composition $Ni_{0.45}Zn_{0.55}(Fe_{0.45}Mn_{0.55})_2O_4$.

Similar reference characters are applied to similar elements throughout the drawing.

Figure 2:
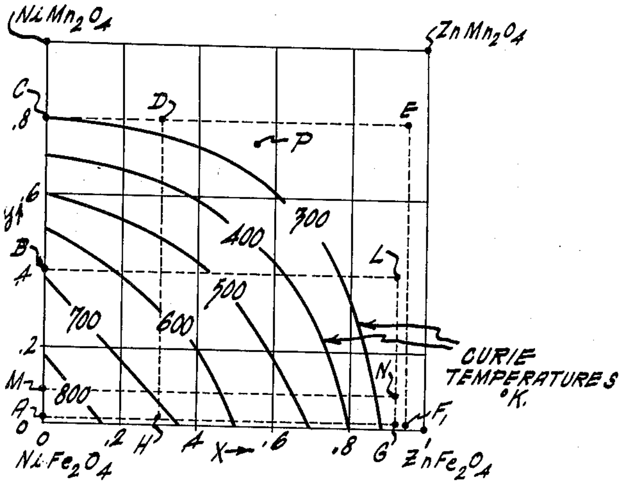
FIGURE 2 is a view of the plane $$NiFe_2O_4—ZnFe_2O_4—ZnMn_2O_4—NiMn_2O_4$$

Referring to FIGURES 1 and 2, the improved mixed ferrospinels of the invention may be represented by the molar formula: $Ni_{1-x}Zn_x(Fe_{1-y}Mn_y)_2O_4$ where $x=0.00$ to 0.95 and $y=0.01$ to 0.80. This is represented in FIGURE 2 by the rectangular area A—C—E—F—A.

The ferrospinels herein which are most useful at about room temperatures (20° C.) are in the range where $x=0.00$ to 0.90 and $y=0.01$ to 0.40. This is representd in FIGURE 2 by the rectangular area A—B—L—G—A. Spinel crystals of these compositions exhibit a domain magnetic anisotropy at or near zero when the temperature thereof is about 20° C. The particularly preferred range of compositions for room temperature operation occur on either side of the line M—N in the foregoing family wherein $x=0.00$ to 0.90 and $y=0.08$. The preferred range of the compositions for room temperature operation occur on either side of this line where $y=0.04$ to 0.14. The preferred ferrospinel for room temperature is represented by the formula $Ni(Fe_{0.92}Mn_{0.08})_2O_4$ which is shown as the point M in FIGURE 2.

The ferrospinels herein which are most useful at about liquid nitrogen temperatures (−196° C.) are in the range where $x=0.30$ to 0.95 and $y=0.01$ to 0.80. This is represented in FIGURE 2 by the rectangular area D—E—F—H—D. Spinel crystals of these compositions exhibit a domain magnetic anisotropy at or near zero when the temperature thereof is about −196° C. The preferred ferrospinel for operation near liquid nitrogen temperature is represented by the formula:

$$(Ni_{0.45}Zn_{0.55})(Fe_{0.45}Mn_{0.55})_2O_4$$

which is shown as point P in FIGURE 2.

The table sets forth selected ferrospinels of the invention indicating the molar composition of the spinel and various of the magnetic properties thereof.

For purposes of comparing the magnetic properties of the mixed ferrospinels of the invention, test toroids of the various compositions are prepared having an outside diameter of about 0.3 centimeter and a height of about 0.2 centimeter. The toroids are wound with a primary input winding of 5 turns and a secondary output winding of 25 turns, each of A.W.G. No. 30 copper wire. A 60 cycle alternating current is passed through the primary winding and the integral of the current induced in the secondary winding is observed on the display of a 60 cycle B–H loop tracer. The maximum flux density $B_m$, the remanent flux density $B_r$, the coercive force $H_c$ are obtained on the same saturation B–H loop (maximum magnetic field was about 50 oersteds). The value $B_r/B_s$ is a qualitative measure of the degree of rectangularity of the toroid. Where the value of $B_r/B_s$ is greater than 0.80, the ferrite is considered to be substantially rectangular.

The Curie temperature data is obtained on test sticks (about 0.15" x 0.15" x 1.50") of the particular composition (prepared together with test toroids) by obtaining a plot of initial permeability versus temperature and noting the temperature at which the function of permeability changed discontinuously to unity. Referring again to FIGURE 2, contour lines are plotted indicating the effect of composition on the Curie temperature of the ferrospinels herein.

The domain magnetic anisotropy is determined as to order of magnitude and sign on test discs (also prepared together with test toroids) by means of magnetostriction measurements. The magnetostriction is obtained as a function of applied field up to 10,000 oersteds using a standard strain gauge technique. The sign of the domain anisotropy is indicated by the sign of the change in magnetostriction parallel to the applied field as the field is reduced from saturating field strengths toward zero. If the magnetostriction becomes more positive, the domain anisotropy is negative; if the magnetostriction becomes more negative the anisotropy is positive; and finally if the magnetostriction does not change as the total effective field is reduced to zero the domain anisotropy is zero.

Referring to the table and FIGURE 2, it will be noted that the substitution of trivalent manganese for trivalent iron in the spinels herein has the effect of first decreasing the rectangularity of the spinel then increasing the rectangularity to a maximum after which the rectangularity again decreases. Over the range of high rectangularity, the coercive force is substantially constant as the trivalent manganese content is varied. In addition, the Curie temperature decreases with increasing trivalent manganese content. The substitution of zinc for nickel has the effect of decreasing the coercive force and increasing the rectangularity and magnetization to a maximum after which, because the Curie temperature decreases with increasing zinc content, the coercive force continues to decrease and the rectangularity and magnetization decreases. It should be noted that compositions having desirable B–H and switching characteristics at liquid nitrogen temperature may be poor or even paramagnetic at room temperature.

Certain other properties have been investigated for the system $Ni(Fe_{1-y}Mn_{y})_2O_4$. The ionic distribution was investigated by means of X-ray diffraction. A cubic structure was observed at room temperature throughout the system, the lattice parameter increasing monotonically with increasing $y$ from 8.34 to 8.39 A. In the range $y=0.0$ to 0.5, $mn^{3+}$ progressively replaces $Fe^{3+}$ in the six-coordinated sites. In the range $y=0.5$ to 1.0, $mn^{3+}$ progressively replaces $Fe^{3+}$ in the four coordinated sites. Hence, $Mn^{3+}$ is not able to displace $Ni^{2+}$ from the six-coordinated sites and $NiMn_2O_4$ ($y=1.0$) is a cubic inverse spinel.

The magnetization is in agreement with the ionic distribution disclosed by the X-ray study. Magnetostriction measurements made as a function of applied field indicated the sign and order of magnitude of the magnetic anisotropy of the samples. The magnetic anisotropy is strongly negative for $NiFe_2O_4$. Increasing substitutions of $Mn^{3+}$ for $Fe^{3+}$ causes the anisotropy to pass through zero at about $y=0.08$ becoming highly positive (K about $+10^5$ ergs/cc.) at $y=0.5$. Heretofore only the $Co^{2+}$ ion was known to produce a positive anisotropy in a spinel.

In the system $Ni(Fe_{1-y}Mn_y)_2O_4$, the coercive force is at a broad minimum and the rectangularity is at a maximum at about the same value of $y$ which produces a zero anisotropy. A theory to explain this follows. A negative anisotropy may be considered to be the preference of a spinel crystal to be magnetized in a direction diagonally, from corner to corner, in the cubic unit of the crystal. A positive anisotropy may be considered to be the preference of a spinel crystal to be magnetized in a direction parallel to crystal edges of the cubic unit cell. A zero anisotropy may be considered to be that condition where the spinel crystal exhibits no preferred magnetization direction.

In a polycrystalline body, the crystallites thereof are randomly oriented. Most crystallites are oriented so that the preferred directions are different from the direction in which magnetization is desired. Thus, the magnetizing field must overcome the preferred directions of most crystallites to a greater or lesser degree. Further, when the magnetizing field is removed, the magnetizations of many crystallites relax, i.e., attempt to revert to the preferred magnetization direction, imparting a low remanence and rounded corners to the magnetic hysteresis loop.

When the anisotropy is zero, the crystals have no preferred magnetization direction, thus requiring a minimum coercive force to magnetize the body in a desired direction. Further, when the magnetizing field is removed, there is no relaxation. Thus, the body exhibits high remanence and sharp corners on the magnetic hysteresis loop.

The ferrospinels herein may be prepared as single crystals. However, it is preferred to prepare them as polycrystalline bodies of sintered metallic oxides.

EXAMPLE

A preferred mixed ferrospinel of the invention for operation at about room temperatures may be prepared according to the following procedure. Prepare a raw batch comprising 14.9 grams NiO, 29.4 grams $Fe_2O_3$ and 2.44 grams $Mn_3O_4$. The raw batch is ball milled in a liquid such as alcohol for about 8 hours to provide intimate mixing of the ingredients and is then dried. The dried raw batch is calcined at about 1000° C. for about one hour in air. Upon cooling, the calcined product is ball milled in water. One percent of a binder such as Trigamine oleate and one percent of a mold lubricant such as stearic acid is added toward the end of the milling period. The milled calcine is then formed by pressing to a toroid about 0.3" O.D. x 0.2" high. Forming pressures of about 20,000 p.s.i. have been found to be satisfactory. The formed calcine is sintered at about 1250° C. in air for about one hour and slowly cooled. The sintered body is then annealed at about 1000° C. for about 72 hours in oxygen and then slowly cooled.

The toroid prepared according to the example is a shaped magnetic core body consisting essentially of a mixed ferrospinel having the molar compositions: $Ni(Fe_{0.92}Mn_{0.08})_2O_4$.

The magnetic hysteresis loop obtained from the toroids prepared according to the example is illustrated in FIGURES 3*a* and 3*b*. Two B–H loops are shown, in FIGURE 3, one for a maximum driving field of 8.4 oersteds and the other for a maximum field of 28.0 oersteds each possessing essentially the same saturation flux density of 1760 gausses. Other properties of the toroid are given under sample No. 4 in the table.

The mixed ferrospinels of the invention may be prepared by methods commonly used in preparing ferrospinel compositions generally. They are preferably made without quenching after sintering, a feature which simplifies quantity production problems. Further, it is preferred to calcine the raw batch and to sinter the formed calcine in air to obtain a maximum oxidation state with ordinary atmospheres. Similarly, it is preferred to anneal the sintered bodies in oxygen so that all of the cations attain the maximum oxidation state consistent with producing a spinel crystal structure.

The process steps for making all of the mixed ferrospinels herein are substantially the same. Raw metallic oxides or their equivalents are mixed together and pulverized by wet milling in a ball mill for an hour or more. An equivalent of a raw metal oxide is any compound which decomposes at temperatures that yield the desired oxides by the chemical reactions which occur during sintering. For example, it is sometimes more convenient to use metallic hydroxides, carbonates, or bicarbonates such as ferric hydroxide, nickel carbonate, or manganese carbonate because they are more readily commercially available and because they are relatively easier to handle. Sometimes it is advantageous to use metallic esters of organic acids such as nickel acetate or ferric formate. It is also desirable in some situations to produce the raw batch by coprecipitation from aqueous solutions, such as in the form of hydroxides.

The raw batch is dried and calcined at a temperature between 800 and 1050° C. for a period greater than 15 minutes. The purpose of calcining is to remove as much of the volatile matter contained in the raw batch as possible and to initiate the chemical reactions between the constituents of the raw batch.

After calcining, the calcined product is milled to reduce its particle size and to insure intimate mixing of the constituents. An organic binder such as paraffin or a resin and a lubricant, such as stearic acid, are added to the calcine toward the end of the milling to facilitate molding. The particular binder and a particular lubricant and the proportions thereof which is used are not critical. About two percent by weight of a fifty percent water suspension of paraffin may be used as a binder and about one percent by weight of stearic acid may be used as a mold lubricant. The weight percent given is based on the total weight of the mixture.

The milled calcine is molded into cores by any convenient method such as by pressing in a die. The cores may be of any desired shape. The shapes currently used commercially are toroids and multi-aperture plates. The molding pressure is not critical although there is an optimum pressure for each particular formulation and core shape.

The formed calcine is slowly heated to burn off the binder and mold lubricant and is then sintered for a period of 15 minutes to 10 hours at a temperature between 900° and 1300° C. The sintering temperature is not critical except that it is preferred to attain the maximum density in the bodies so as to obtain the optimum magnetic properties therefrom. The higher the sintering temperature the shorter should be the sintering time. After firing, the bodies are cooled slowly. By slow cooling is meant an average rate of cooling not in excess of 5° C. per minute.

Following sintering, the bodies are annealed at about 1000° C. for an extended period of time in oxygen. Temperatures between 900 and 1050° C. for periods of 10 to 100 hours are satisfactory. The purpose of annealing the bodies in oxygen is to bring the mixed ferrospinel composition to its maximum oxidation state, particularly that of the manganese and the iron, consistent with producing a spinel crystal structure. A desirable property of the ferrospinels herein are that they attain very stable oxidation states. This permits the establishment of the desired structure by allowing the oxidation process to go to completion. Such is not the case for many presently used ferrites which require a delicate balance between such ions as $Mn^{2+}$ and $Mn^{3+}$.

The ferrospinels herein may be described as solid solutions of $NiFe_2O_4$, $ZnFe_2O_4$, $ZnMn_2O_4$ and $NiMn_2O_4$. All of the compositions therefore have a stoichiometric ratio of NiO plus ZnO to $Fe_2O_3$ plus $Mn_2O_3$ of one to one. This ratio may be departed from to some extent without radically affecting the magnetic properties of the particular composition. The range of compositions expressed as oxides may be stated as follows in terms of mol fractions:

NiO ---------- $\frac{1-x}{2}$

ZnO ---------- $\frac{x}{2}$ $Fe_2O_3$ ---------- $\frac{1-y}{2}$ $Mn_2O_3$ ---------- $\frac{y}{2}$ where $x=0.00$ to $0.90$ and $y=0.01$ to $0.80$.

The desired ranges in mol fractions are:

NiO ---------- 0.50 to 0.05
ZnO ---------- 0.00 to 0.45
$Mn_2O_3$ ---------- 0.005 to 0.40
$Fe_2O_3$ ---------- 0.495 to 0.10

*Table*

| No. | Plotted Composition [c] | | Raw Batch (Mols) | | | | $B_s$-$H_m$ or $4\pi I_s$ | Properties [a] | | $T_c$, °K. |
|---|---|---|---|---|---|---|---|---|---|---|
| | $x$ | $y$ | NiO | $Fe_2O_3$ | $Mn_2O_3$ | ZnO | | $H_c$ oer. | $B_r/B_s$ | |
| 1 | 0 | 0 | .50 | .50 | ------ | ------ | 1,800 | 3.0 | 0.75 | 843 |
| 2 | 0 | 0.04 | .50 | .48 | .020 | ------ | 2,070 | 4.0 | 0.6 | ------ |
| 3 | 0 | 0.0625 | .50 | .4688 | .0312 | ------ | 1,960 | 4.0 | 0.5 | 823 |
| 4 | 0 | 0.08 | .50 | .46 | .04 | ------ | 1,730 | 3 | 0.85 | ------ |
| 5 | 0 | 0.09 | .50 | .455 | .045 | ------ | 1,650 | 4 | 0.8 | ------ |
| 6 | 0 | 0.10 | .50 | .45 | .05 | ------ | 1,530 | 3.0 | 0.8 | 800 |
| 7 | 0 | .1876 | .50 | .4062 | .0938 | ------ | 1,700 | 8.0 | 0.7 | 780 |
| 8 | 0.30 | 0.20 | .35 | .40 | .10 | .15 | 2,750 | 2.0 | 0.9 | 616 |
| 9 | 0 | 0.25 | .50 | .375 | .125 | ------ | 1,540 | 12 | 0.6 | 742 |
| 10 | 0.30 | 0.25 | .35 | .375 | .125 | .15 | 2,700 | 2.0 | 0.9 | ------ |
| 11 | 0.30 | 0.30 | .35 | .35 | .15 | .15 | 2,600 | 1.5 | 0.9 | 600 |
| 12 | 0 | 0.34 | .50 | .33 | .17 | ------ | 1,450 | 8 | 0.6 | 742 |
| 13 | 0.30 | 0.375 | .35 | .3125 | .1875 | .15 | 2,500 | 1.5 | 0.8 | ------ |
| 14 | 0 | 0.375 | .50 | .3125 | .1875 | ------ | 1,310 | 12 | 0.6 | 715 |
| 15 | 0 | 0.42 | .50 | .29 | .21 | ------ | 1,300 | 20 | 0.4 | 666 |
| 16 | 0 | 0.50 | .50 | .25 | .25 | ------ | ------ | ------ | ------ | 643 |
| 17 | 0.55 | 0.55 | .225 | .225 | .275 | .275 | 1,100<br>[b] 3,760 | 0.2<br>[b] 3.5 | 0.6<br>[b] 0.9 | 368 |
| 18 | 0.60 | 0.60 | .20 | .20 | .30 | .30 | ------<br>[b] 2,500 | ------<br>[b] 5 | ------<br>[b] 0.9 | 310 |

[a] Measurements at room temperature unless otherwise indicated.
[b] Measurements made at liquid nitrogen temperature.
[c] $x$ and $y$ are compositional parameters specified by the general compositional formula $Ni_{1-x}Zn_x(Fe_{(1-y)}Mn_y)_2O_4$.

What is claimed is:

1. A mixed ferrospinel having a substantially rectangular hysteresis loop and prepared by heating at about 900 to 1300° C. in oxygen at about atmospheric pressure a mixture consisting essentially of metal oxides in proportions corresponding to the molar composition:

$$Ni_{1-x}Zn_x(Fe_{1-y}Mn_y)_2O_4$$

where $x=0.00$ to 0.95
$y=0.01$ to 0.80

2. A mixed ferrospinel having a substantially rectangular hysteresis loop and prepared by heating at about 900 to 1300° C. in oxygen at about atmospheric pressure a mixture consisting essentially of metal oxides in proportions corresponding to the molar composition:

$$Ni_{1-x}Zn_x(Fe_{1-y}Mn_y)_2O_4$$

where $x=0.00$ to 0.90
$y=0.01$ to 0.40

3. A mixed ferrospinel having a substantially rectangular hysteresis loop and prepared by heating at 900° to 1300° C. in air a mixture consisting essentially of metal oxides in the proportions corresponding to the molar composition:

$$Ni(Fe_{1-y}Mn_y)_2O_4$$

where $y=0.04$ to 0.14 and then annealing said mixture in oxygen at about atmospheric pressure at about 900° to 1050° C. for 10 to 100 hours.

4. A mixed ferrospinel having a substantially rectangular hysteresis loop and prepared by heating at 900° to 1300° C. in air a calcined mixture consisting essentially of metal oxides in the proportions corresponding to the molar composition:

$$Ni(Fe_{0.92}Mn_{0.08})_2O_4$$

and then annealing said mixture in oxygen at about atmospheric pressure at about 900 to about 1050° C. for 10 to 100 hours.

5. A mixed ferrospinel having a substantially rectangular hysteresis loop and prepared by heating at 900° to 1300° C. in air a mixture consisting essentially of metal oxides in the proportions corresponding to the molar composition:

$$Ni_{1-x}Zn_x(Fe_{0.92}Mn_{0.08})_2O_4$$

where $x=0.00$ to 0.90 and then annealing said mixture in oxygen at about atmospheric pressure at about 900 to 1050° C. for 10 to 100 hours.

6. A mixed ferrospinel having a substantially rectangular hysteresis loop and prepared by heating at about 900 to 1300° C. in oxygen at about atmospheric pressure a mixture consisting essentially of metal oxides in proportions corresponding to the molar composition:

$$Ni_{1-x}Zn_x(Fe_{1-y}Mn_y)_2O_4$$

where $x=0.00$ to 0.90
$y=0.04$ to 0.14

7. A mixed ferrospinel having a substantially rectangular hysteresis loop and prepared by heating at about 900 to 1300° C. in oxygen at about atmospheric pressure a mixture consisting essentially of metal oxides in proportions corresponding to the molar composition:

$$Ni_{1-x}Zn_x(Fe_{0.92}Mn_{0.08})_2O_4$$

where $x=0.30$ to 0.95

8. A mixed ferrospinel having a substantially rectangular hysteresis loop and prepared by heating at 900° to 1300° C. in air a calcined mixture consisting essentially of metal oxides in the proportions corresponding to the molar composition:

$$Ni_{0.45}Zn_{0.55}(Fe_{0.45}Mn_{0.55})_2O_4$$

and then annealing said mixture in oxygen at about atmospheric pressure at about 900 to 1050° C. for 10 to 100 hours.

9. A shaped ferromagnetic core body having a substantially rectangular hysteresis loop and prepared by heating at about 900 to 1300° C. in oxygen at about atmospheric pressure a calcined mixture consisting essentially of metal oxides in proportions corresponding to the molar composition:

$$Ni_{1-x}Zn_x(Fe_{1-y}Mn_y)_2O_4$$

where $x=0.00$ to 0.95
$y=0.01$ to 0.80

10. A shaped ferromagnetic core body having a substantially rectangular hysteresis loop and prepared by heating at about 900 to 1300° C. in oxygen at about atmospheric pressure a calcined mixture consisting essentially of metal oxides in proportions corresponding to the molar composition:

$$Ni_{1-x}Zn_x(Fe_{1-y}Mn_y)_2O_4$$

where $x=0.00$ to 0.90
$y=0.01$ to 0.40

11. A shaped ferromagnetic core body having a substantially rectangular hysteresis loop and prepared by heating at 900° to 1300° C. in air a calcined mixture consisting essentially of metal oxides in the proportions corresponding to the molar composition:

$$Ni(Fe_{1-y}Mn_y)_2O_4$$

where $y=0.04$ to 0.14 and then annealing said mixture in oxygen at about atmospheric pressure at about 900 to 1050° C. for 10 to 100 hours.

12. A shaped ferromagnetic core body having a substantially rectangular hysteresis loop and prepared by heating at 900° to 1300° C. in air a calcined mixture consisting essentially of metal oxides in the proportions corresponding to the molar composition:

$$Ni_{1-x}Zn_x(Fe_{1-y}Mn_y)_2O_4$$

where $x=0.00$ to 0.90
$y=0.04$ to 0.14 and then annealing said mixture in oxygen at about atmospheric pressure at about 900 to 1050° C. for 10 to 100 hours.

13. A shaped ferromagnetic core body having a substantially rectangular hysteresis loop and prepared by heating at about 900 to 1300° C. in oxygen at about atmospheric pressure a calcined mixture consisting essentially of metal oxides in proportions corresponding to the molar composition:

$$Ni_{1-x}Zn_x(Fe_{1-y}Mn_y)_2O_4$$

where $x=0.30$ to 0.95
$y=0.01$ to 0.80

14. A mixed ferrospinel body having a substantially rectangular hysteresis loop and consisting essentially of a solid solution of:

$$NiFe_2O_4 \text{ and } ZnFe_2O_4$$

wherein 1 to 80 mol percent of the trivalent iron content thereof is replaced with trivalent manganese, said body having been prepared by heating at about 900 to 1300° C. in oxygen at about atmospheric pressure a calcined and formed mixture of constituent metal oxides.

15. A ferromagnetic mixed spinel core having a substantially rectangular hysteresis loop and produced by sintering in an oxidizing atmosphere at about 900° to 1300° C. a calcined and formed mixture consisting essentially of:

0.50 to 0.05 mol parts NiO
0.00 to 0.45 mol parts ZnO 0.005 to 0.40 mol parts $Mn_2O_3$
0.495 to 0.10 mol parts $Fe_2O_3$ and then annealing said mixture in oxygen at about atmospheric pressure at about 900 to 1050° C. for 10 to 100 hours.

16. A ferromagnetic ferrite body having a substantially rectangular hysteresis loop produced by calcining a mixture consisting essentially of:

$$\frac{1-x}{2} \text{ mol parts NiO}$$

$$\frac{x}{2} \text{ mol parts ZnO}$$

$$\frac{1-y}{2} \text{ mol parts } Fe_2O_3$$

$$\frac{y}{2} \text{ mol parts } Mn_2O_3$$

where $x=0.00$ to 0.90, and $y=0.01$ to 0.80 forming said calcine to a desired shape, heating said formed calcine in air at about 900 to 1300° C., and then annealing said formed calcine in oxygen at about atmospheric pressure at about 900 to 1050° C., for about 10 to 100 hours.

17. A method for preparing a mixed ferrite body having a substantially rectangular hysteresis loop and comprising intimately mixing a raw batch consisting essentially of:

0.50 to 0.05 mol parts NiO
0.00 to 0.45 mol parts ZnO
0.005 to 0.40 mol parts $Mn_2O_3$
0.495 to 0.10 mol parts $Fe_2O_3$ calcining said raw batch at a temperature between 800 and 1050° C. in air; forming the calcine to a predetermined shape; sintering said shaped calcine at a temperature between 1000 and 1300° C. in air, and then annealing said sintered body in an atmosphere of oxygen at about atmospheric pressure at temperatures between 900° C. and 1050° C.

18. A method for preparing a mixed ferrite body having a substantially rectangular hysteresis loop comprising intimately mixing:

0.50 to 0.05 mol parts NiO
0.00 to 0.45 mol parts ZnO
0.005 to 0.40 mol parts $Mn_2O_3$
0.495 to 0.10 mol parts $Fe_2O_3$ calcining said raw batch at a temperature of about 1000° C. in air, forming the calcine to a predetermined shape, sintering said shaped calcine at about 1100° C. in air, and then annealing said sintered body at a temperature of about 1000° C. in oxygen at about atmospheric pressure.

References Cited in the file of this patent

UNITED STATES PATENTS

| | | |
|---|---|---|
| 2,565,861 | Leverenz et al. | Aug. 28, 1951 |
| 2,576,456 | Harvey et al. | Nov. 27, 1951 |
| 2,961,407 | Piekarski | Nov. 22, 1960 |

FOREIGN PATENTS

| | | |
|---|---|---|
| 571,642 | Canada | Mar. 3, 1959 |
| 538,195 | Italy | Jan. 18, 1956 |
| 677,418 | Great Britain | Aug. 13, 1952 |
| 735,375 | Great Britain | Aug. 17, 1955 |
| 737,284 | Great Britain | Sept. 21, 1955 |
| 1,128,631 | France | Aug. 27, 1956 |

OTHER REFERENCES

Gorter: Proceedings of the IRE, December 1955, pp. 1953–1960.

Kordes et al.: Chemical Abstracts, vol. 46, col. 4411, May 25, 1952.

UNITED STATES PATENT OFFICE

CERTIFICATE OF CORRECTION

Patent No. 3,055,833 September 25, 1962

Philip K. Baltzer

It is hereby certified that error appears in the above numbered patent requiring correction and that the said Letters Patent should read as corrected below.

Column 3, line 51, for "$Ni(Fe_{1-y}Mn_{y2}O_4.$" read -- $Ni(Fe_{1-y}Mn_y)_2O_4.$ --; lines 56 and 57, for "mn", each occurrence, read -- Mn --; column 8, line 32, line 45, and column 9, line 4, after "for" insert -- about --.

Signed and sealed this 24th day of September 1963.

(SEAL)
Attest:

ERNEST W. SWIDER
Attesting Officer

DAVID L. LADD
Commissioner of Patents